(12) United States Patent
Kuo et al.

(10) Patent No.: US 8,403,754 B2
(45) Date of Patent: Mar. 26, 2013

(54) INTERACTIVE GAME APPARATUS AND GAME CONTROLLER USED IN THE SAME

(75) Inventors: Ming Hui Kuo, Hsin-Chu (TW); Cho Yi Lin, Hsin-Chu (TW)

(73) Assignee: Pixart Imaging Inc., Hsin-Chu (TW)

( * ) Notice: Subject to any disclaimer, the term of this patent is extended or adjusted under 35 U.S.C. 154(b) by 871 days.

(21) Appl. No.: 11/466,999

(22) Filed: Aug. 24, 2006

(65) Prior Publication Data
US 2007/0252815 A1 Nov. 1, 2007

(30) Foreign Application Priority Data
Apr. 26, 2006 (TW) .............................. 95114830 A

(51) Int. Cl.
*A63F 13/06* (2006.01)
(52) U.S. Cl. ............................. 463/39; 463/36; 345/156
(58) Field of Classification Search ............... 463/30–40
See application file for complete search history.

(56) References Cited

U.S. PATENT DOCUMENTS

| | | | |
|---|---|---|---|
| 6,545,661 B1 * | 4/2003 | Goschy et al. ................ | 345/158 |
| 6,908,386 B2 | 6/2005 | Suzuki et al. | |
| 6,908,388 B2 | 6/2005 | Shimizu et al. | |
| 7,733,326 B1 * | 6/2010 | Adiseshan .................... | 345/156 |
| 2003/0109304 A1 * | 6/2003 | Gauselmann .................. | 463/30 |
| 2004/0166936 A1 * | 8/2004 | Rothschild et al. ............ | 463/35 |
| 2004/0166937 A1 * | 8/2004 | Rothschild et al. ............ | 463/36 |
| 2004/0204240 A1 * | 10/2004 | Barney ............................ | 463/36 |
| 2004/0259651 A1 * | 12/2004 | Storek ........................... | 473/131 |
| 2005/0143173 A1 * | 6/2005 | Barney et al. .................. | 463/37 |
| 2005/0212749 A1 * | 9/2005 | Marvit et al. .................. | 345/156 |
| 2006/0258454 A1 * | 11/2006 | Brick .............................. | 463/36 |

FOREIGN PATENT DOCUMENTS
TW           588258        5/2004

\* cited by examiner

*Primary Examiner* — Arthur O. Hall
*Assistant Examiner* — Steve Rowland
(74) *Attorney, Agent, or Firm* — Egbert Law Offices, PLLC

(57) ABSTRACT

An interactive game apparatus includes a game host and a game controller. The game host includes a game control module capable of running a game program and receiving at least one response signal outputted from the game control. The game controller includes a first motion sensor, a second motion sensor and a processor. The first motion sensor detects motion signals of the play, and the second motion sensor also detects motion signals. Furthermore, the processor includes a determination circuit determining the timing for activating either the first motion sensor or the second motion sensor.

20 Claims, 3 Drawing Sheets

INTERACTIVE GAME APPARATUS AND GAME CONTROLLER USED IN THE SAME

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to an interactive game apparatus and a game controller used in the same and, more particularly, to an interactive game apparatus having a game controller into which two kinds of motion sensors are integrated.

2. Description of Related Art Including Information Disclosed Under 37 CFR 1.97 and 37 CFR 1.98.

Electronic game apparatuses currently provide three-dimensional animation scenes with brilliant images and realistic sound effects. Therefore, players enjoy interactive and real time amusement through their immediate instructions detected by wireless peripheral modules. That is, the players can utilize joysticks and buttons to control specified objects shown in images. Moreover, they give full play to their handling ability as the story of the game changes.

Excluding utilizing joysticks and buttons to control objects on a monitor, R.O.C. patent No. 588,258 puts forth a game apparatus 11 utilizing a camera to control the location of the cursor representing an object, as shown in FIG. 1. An image sensor 12 captures optical instructions from a player 90. For example, a light beam emitted from an infrared pointer 13 is held and moved by the player 90, and a light gun is triggered to emit light. However, such an image sensor 12 has a disadvantage because of the limitation of a visual angle range 14 for effectively receiving light. In some cases, additional reflective dots acting as reference points are needed to mark the margin of the visual angle range 14. When the light beam emitted from the infrared pointer 13 is out of either the vertical view angle or the horizontal view angle, the control of objects in the game is temporarily terminated and control of the game may be lost. In particular, the light beam is likely to be sheltered by an obstacle such as a desk lamp or a decoration so as to cause the instruction transmission to unintentionally pause. That is, the player 90 cannot sequentially perform the interactive function of the game apparatus 11. U.S. Pat. No. 5,786,804 also puts forth a similar technique utilizing an image sensor capturing optical instructions from a player.

Furthermore, U.S. Pat. Nos. 6,908,386 and 6,908,388 disclose a game controller having tilt sensor to detect 3-dimensional (X, Y, and Z axes) motion instructions given by the player. For example, acceleration movement toward a specified direction results in electrical signals that are transmitted to a game host and a monitor. Unlike the image sensor 12, the use of the tilt sensor is not limited by the visual angle range. However, it cannot point the cursor representing an object under control at an accurate position. In particular, the quality of the game execution is severely affected by the issues regarding to locating the initial position of the cursor and to relocating its position after a pause. Such a game controller is also limited by a substantial connection cable, because the distance between the game controller and the game host cannot be flexibly extended. If the connection cable is blocked by obstructions, it needs to be routed over or around the obstructions.

As a result, the conventional game apparatus and game controller cannot satisfy the requirements of the player. Accordingly, the interactive game is awkward to be manipulated.

BRIEF SUMMARY OF THE INVENTION

An objective of the present invention is to provide an interactive game apparatus and a game controller used in the same. The manipulation status of the executed game program is detected in real time. The determination circuit of the game controller designates either a first motion sensor or a second motion sensor to detect instructions or motion signals from a player. In some special cases, both of the first motion sensor and second motion sensor simultaneously detect the instructions of the player to have a real time response. For example, an object in play needs to be accurately positioned.

Another objective of the present invention is to provide a game controller adaptive to immediate manipulation statuses. Compared with aforesaid conventional arts, it can enlarge the effective and controllable play space so that the player does not worry whether he is outside the play space. Therefore, the interactive game apparatus is enhanced on its user-friendly design. Furthermore, the game controller comprises at least two kinds of motion sensors so as to enable the player to have accurate motion control in the progress of the game.

In order to achieve the objectives, the present invention is to provide an interactive game apparatus comprising a game host and a game controller. The game host includes a game control module capable of running a game program and receiving at least a response signal outputted from the game controller. The game controller comprises a first motion sensor, a second motion sensor and a processor. The first motion sensor detects motion signals of the player, and the second motion sensor also detects motion signals. Furthermore, the processor includes a determination circuit determining the timing for activating either the first motion sensor or the second motion sensor.

The bi-directional data communication between the game host and game controller is carried out by wireless radio frequency (RF) signals. The game host comprises a first data conversion circuit converting the output signals of the game control module to a first wireless signal complying with an RF format. Afterward, a first transceiver wirelessly transmits data to the game controller. Similarly, the game controller also comprises a second data conversion circuit converting the output signals of the processor to a second wireless signal complying with the RF format. Sequentially, a second transceiver wirelessly transmits data to the game host.

BRIEF DESCRIPTION OF THE SEVERAL VIEWS OF THE DRAWINGS

The invention will be described according to the appended drawings.

DETAILED DESCRIPTION OF THE INVENTION

Figure 1:
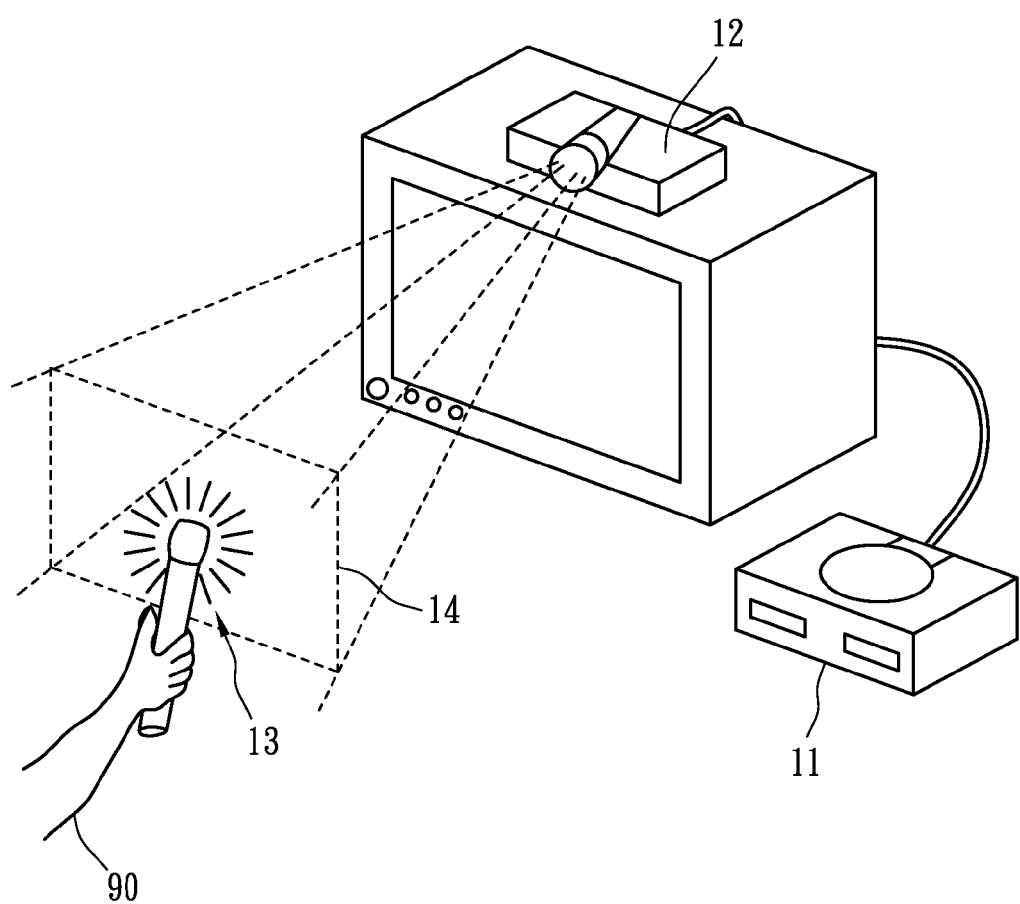
FIG. 1 is a schematic view of a diagram of a conventional interactive game apparatus.
Figure 2:
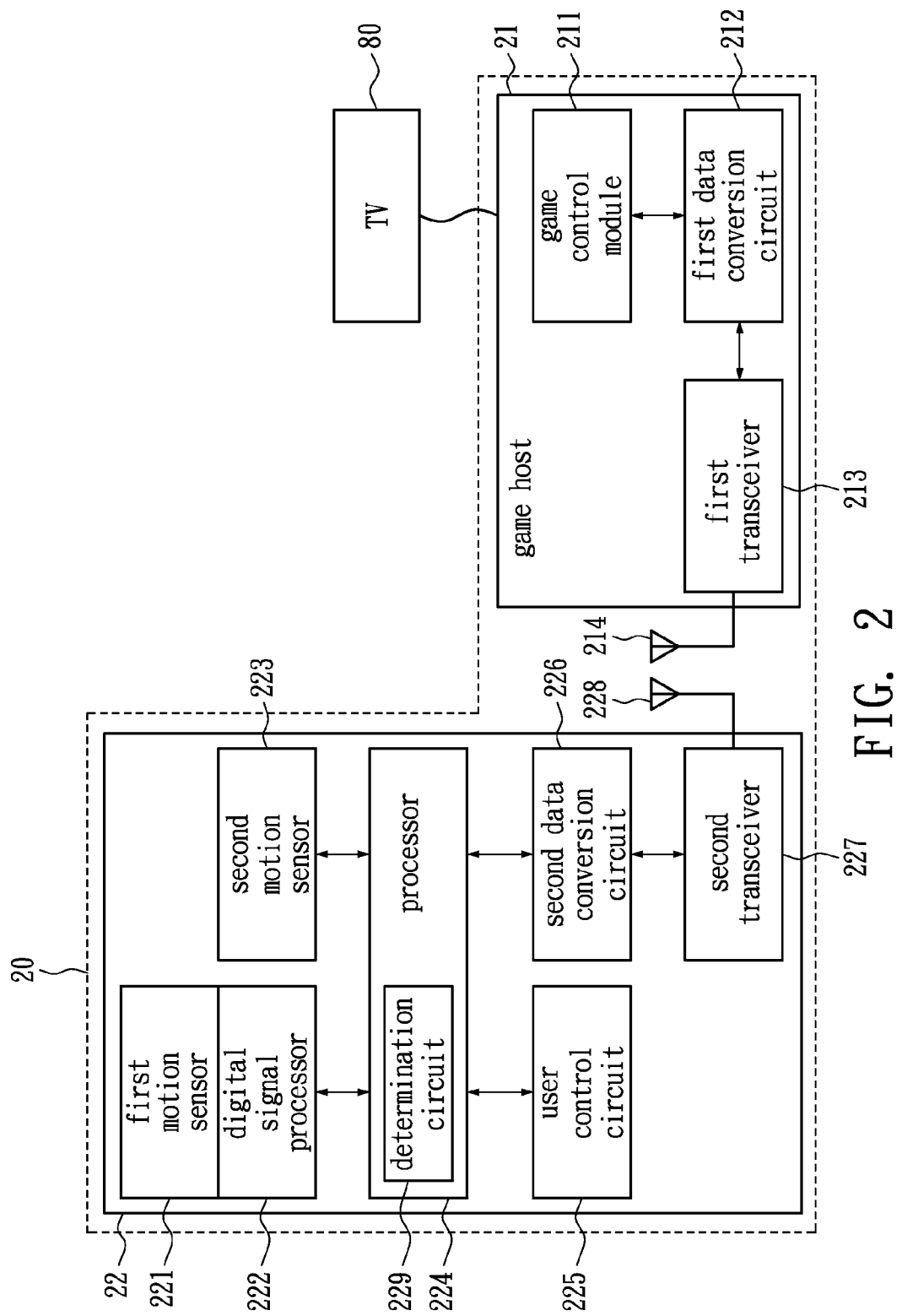
FIG. 2 is a schematic view of a diagram of an interactive game apparatus in accordance with the first embodiment of the present invention.

FIG. 2 is a schematic diagram of an interactive game apparatus in accordance with the first embodiment of the present invention. The interactive game apparatus 20 comprises a game host 21 and a game controller 22. The game host 21 is connected to a television (TV) 80 for showing game plays and includes a game control module 211 capable of running a game program, and bi-directionally communicates with the game controller 22 by wireless signals. Furthermore, the game host 21 comprises a first data conversion circuit 212 converting the output signals of the game control module 211 to a first wireless signal complying with an RF format. Afterward, a first transceiver 213 wirelessly transmits data to the game controller 22 through an antenna 214.

The game controller 22 comprises a first motion sensor 211 such as an image sensor, a second motion sensor 223 such as a tilt sensor and a processor 224. The first motion sensor 221 detects optical motion signals of a player, and is a kind of image sensor capturing images of an object—CMOS (complementary metal-oxide semiconductor) image sensors or CCD image sensors, for example. The second motion sensor 223 is a kind of gravity action sensor detecting the motion instructions of the player, or a gyro sensor or an acceleration sensor also can replace the tilt sensor. The first motion sensor 221 further converts the optical signals of continuous images into the digital signals of plural frames. Sequentially, a digital signal processor 222 compresses and filters the digital signals, so as to obtain digital signals regarding the number, dimensions, shapes and coordinates of the objects detected in each frame. Such digital signals are transmitted to the processor 224, a backend circuit. The digital signal processor 222 and first motion sensor 221 are two divided devices or can be integrated into an IC to form a system on chip (SOC). The second motion sensor 223 is capable of detecting 3-dimensional changes in the postures of the limbs or hands of the player, and the detected optical signal is converted into motion signals for output to the processor 224. The processor 224 comprises a determination circuit 229 determining the timing for activating either the first motion sensor 211 or the second motion sensor 223. That is, one of the motion sensors is specially activated or both are alternatively activated when some statuses occur or specified games are executed. Moreover, both can be simultaneously activated when certain statuses occur. Therefore, the game apparatus 20 is adaptive to the instant changes of game manipulation.

The game controller 22 also comprises a second data conversion circuit 226 and a second transceiver 227, wherein the second data conversion circuit 226 converts the output signals of the processor 224 to a second wireless signal complying with the RF format. Afterward, a second transceiver 227 wirelessly transmits data to the game host 21 through an antenna 228. Furthermore, the game controller 22 comprises a user control circuit 225 for the player to set parameters, play modes and conditions of the game.

Figure 3:
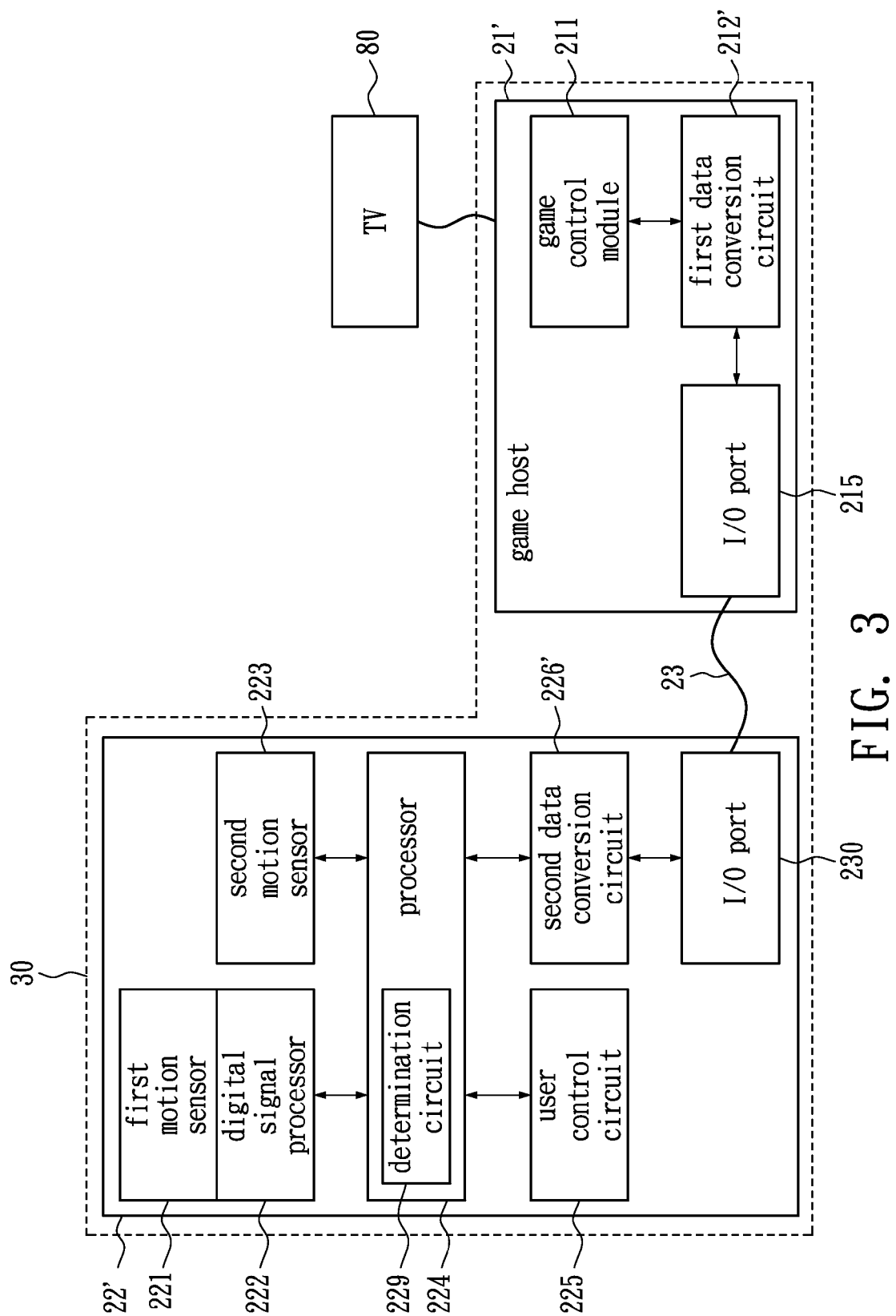
FIG. 3 is a schematic view of a diagram of an interactive game apparatus in accordance with the second embodiment of the present invention.

Referring to FIG. 3, the bi-directional communication between the game host 21 and game controller 22 in FIG. 2 also can be implemented by a connection cable 23. There is a second embodiment shown in FIG. 3. The interactive game apparatus 30 comprises a game host 21' and a game controller 22'. But the first data conversion circuit 212' and a second data conversion circuit 226' are respectively connected to input/output (I/O) ports 215 and 230. The connection cable 23 connects I/O ports 215 and 230 that respectively convert digital signals to a first transmission signals compatible with the I/O port 215 and convert digital signals to a second transmission signals compatible with the I/O port 230.

The aforementioned descriptions of the present invention are intended to be illustrative only. Numerous alternative methods may be devised by persons skilled in the art without departing from the scope of the following claims.

We claim:

1. An interactive game apparatus for at least one player to manipulate a game in progress, the interactive game apparatus comprising:
   a game controller comprising:
      at least one first motion sensor suitable for directly detecting a first motion signal from a motion of the player;
      at least one second motion sensor suitable for directly detecting a second motion signal from the motion of the player;
      a processor coupled to the first motion sensor and the second motion sensor, said processor being suitable for selecting the first motion signal or the second motion signal to process according to a current manipulation status so as to output at least one control signal wherein said processor is configured to activate one or both of the first and second motion sensors in response to a game control requirement of the game; and
      a digital signal processor suitable for compressing and filtering the first motion signals from the first motion sensor, wherein said digital signal processor and the first motion sensor are integrated into an IC;
   a game host receiving the control signal outputted from said processor of said game controller, said game host having a game control module suitable for executing a game program and outputting at least one response signal; and
   a user control circuit suitable for allowing the player to set at least one of a parameter, a play mode and a condition of the game through bi-directional communications between said game controller and said game host.

2. The interactive game apparatus of claim 1, wherein said processor comprises a determination circuit suitable for determining a timing for activating either or both of said first motion sensor and said second motion sensor as a control source for outputting the at least one control signal.

3. The interactive game apparatus of claim 1, wherein said game host further comprises a first data conversion circuit and a first transceiver, wherein said first data conversion circuit is coupled to said game control module so as convert the response signals outputted by said game control module to a first wireless signal complying with an RF format, and said first transceiver is coupled to said first data conversion circuit so as to wirelessly transmit said first wireless signals to the game controller.

4. The interactive game apparatus of claim 3, wherein said game controller further comprises a second data conversion circuit and a second transceiver, wherein the second data conversion circuit is coupled to said processor so as to convert the output signals of said processor to a second wireless signal complying with the RF format, said second transceiver is coupled to said second data conversion circuit so as to wirelessly transmit the second wireless signal to said first transceiver.

5. The interactive game apparatus of claim 1, wherein said game host further comprises a first data conversion circuit and a first input/output port, said first data conversion circuit suitable for converting the response signal outputted by said game control module to a first transmission signal compatible with said first input/output port.

6. The interactive game apparatus of claim 5, wherein said game controller further comprises a second data conversion circuit and a second input/output port, said second data conversion circuit suitable for converting the control signal outputted by said processor to a second transmission signal compatible with said second input/output port.

7. The interactive game apparatus of claim 1, wherein said game controller further comprises a digital signal processor suitable for compressing and filtering the motion signals from the first motion sensor.

8. A game controller for at least one player to manipulate a game in progress, the game controller comprising:
- at least one first motion sensor suitable for directly detecting a first motion signal from a motion of the player;
- at least one second motion sensor suitable for directly detecting a second motion signal from the motion of the player; and
- a processor coupled to the first motion sensor and the second motion sensor, said processor suitable for selecting the first motion signal or the second motion signal to process according to a current manipulation status so as to output at least one control signal, wherein said processor is configured to activate one or both of the first and second motions sensors in response to a game control requirement of the game;
- a user control circuit suitable for allowing the player to set at least one of a parameter, a play mode, and a condition of the game through bi-directional communications between said game controller and said game host; and
- a digital signal processor suitable for compressing and filtering the first motion signals from the first motion sensor, wherein said digital signal processor and the first motion sensor are integrated into an IC.

9. The game controller of claim 8, wherein said processor comprises a determination circuit suitable for determining a timing for activating either or both of the first motion sensor and the second motion sensor as a control source for outputting the at least one control signal.

10. The game controller of claim 8, further comprising:
- a second data conversion circuit and a second transceiver, wherein said second data conversion circuit is coupled to said processor so as to convert the output signals of said processor to a second wireless signal complying with an RF format, and said second transceiver is coupled to said second data conversion circuit so as to wirelessly transmit the second wireless signal to an external receiving system.

11. The game controller of claim 8, wherein the game controller further comprises:
- a second data conversion circuit and a second input/output port, said second data conversion circuit suitable for converting the control signal outputted by said processor to a second transmission signal compatible with said second input/output port, wherein said second input/output port is connected to an external system by a connection cable.

12. The interactive game apparatus of claim 1, wherein said first motion sensor including an image sensor having a visual angle range, said current manipulation status depending on said second motion sensor including a gravity action sensor when the player is outside of said visual angle range.

13. The interactive game apparatus of claim 12, said current manipulation status depending entirely on said image sensor when the second motion signal of said second motion sensor cannot be read.

14. The interactive game apparatus of claim 12, the game having an object in play, said current manipulation status having both said image sensor and said gravity action sensor active so as to accurately position the object in play.

15. The game controller of claim 8, wherein said first motion sensor including an image sensor having a visual angle range, said current manipulation status depending on said second motion sensor including a gravity action sensor when the player is outside of said visual angle range.

16. The game controller of claim 15, said current manipulation status depending entirely on said image sensor when the second motion signal of said gravity action sensor cannot be read.

17. The game controller of claim 8, the game having an object in play, said current manipulation status having both said image sensor and said gravity action sensor active so as to accurately position the object in play.

18. The game controller of claim 1, the first motion sensor being an image sensor, the second motion sensor being a gravity action sensor.

19. The game controller of claim 8, the first motion sensor being an image sensor, the second motion sensor being a gravity action sensor.

20. An interactive game apparatus for at least one player to manipulate a game in progress, the interactive game apparatus comprising:
- a game controller comprising:
  - at least one image sensor suitable for directly detecting a first motion signal from a motion of the player;
  - at least one gravity sensor suitable for directly detecting a second motion signal from the motion of the player;
  - a processor coupled to the image sensor and the gravity sensor, said processor being suitable for selecting the first motion signal or the second motion signal to process according to a current manipulation status so as to output at least one control signal wherein said processor is configured to activate one or both of the image and gravity sensors in response to a game control requirement of the game; and
- a game host receiving the control signal outputted from said processor of said game controller, said game host having a game control module suitable for executing a game program and outputting at least one response signal, wherein the image sensor is configured to calculate a coordinate of an object in a captured image, and wherein the gravity sensor is configured to calculate a motion direction of the game controller;
  - wherein said game controller further comprises a digital signal processor suitable for compressing and filtering the first motion signals from the image sensor, wherein said digital signal processor and the image sensor are integrated into an IC.

* * * * *